(12) United States Patent
Abe et al.

(10) Patent No.: US 12,510,191 B2
(45) Date of Patent: Dec. 30, 2025

(54) OIL-WELL METAL PIPE

(71) Applicants: NIPPON STEEL CORPORATION, Tokyo (JP); VALLOUREC OIL AND GAS FRANCE, Aulnoye-Aymeries (FR)

(72) Inventors: Tomoka Abe, Tokyo (JP); Keishi Matsumoto, Tokyo (JP); Mamoru Ochiai, Tokyo (JP); Yuichi Iwaki, Tokyo (JP)

(73) Assignees: NIPPON STEEL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 62 days.

(21) Appl. No.: 18/700,561

(22) PCT Filed: Oct. 13, 2022

(86) PCT No.: PCT/JP2022/038194
§ 371 (c)(1),
(2) Date: Sep. 23, 2024

(87) PCT Pub. No.: WO2023/063385
PCT Pub. Date: Apr. 20, 2023

(65) Prior Publication Data
US 2025/0314335 A1   Oct. 9, 2025

(30) Foreign Application Priority Data
Oct. 15, 2021   (JP) ................. 2021-169258

(51) Int. Cl.
*F16L 58/04*   (2006.01)
*C09D 7/48*   (2018.01)
(Continued)

(52) U.S. Cl.
CPC ............. *F16L 15/04* (2013.01); *C09D 7/48* (2018.01); *C09D 7/61* (2018.01); *C09D 163/00* (2013.01); *C09D 175/04* (2013.01); *F16B 7/182* (2013.01)

(58) Field of Classification Search
CPC ....... F16L 15/04; F16L 15/001; F16L 15/004; F16L 58/00; F16L 58/02; F16L 58/04; F16L 58/18; F16L 58/182
See application file for complete search history.

(56) References Cited

U.S. PATENT DOCUMENTS

| | | |
|---|---|---|
| 8,453,740 B2 | 6/2013 | Mohan et al. |
| 10,281,078 B2 | 5/2019 | Kawai et al. |

(Continued)

FOREIGN PATENT DOCUMENTS

| | | |
|---|---|---|
| CN | 1056510 A | 11/1991 |
| CN | 102329553 A | 1/2012 |

(Continued)

OTHER PUBLICATIONS

Klimov K. I. and Rudakova L. F., "Device and Method for Comparative Assessment of Abriating Solid Lubricant Coatings—Methods for Studying Oils and Oil Products, Additives, Catalysts and Adsorbents" Publishing house "Chemistry"; Moscow 1967.

*Primary Examiner* — Aaron M Dunwoody
(74) *Attorney, Agent, or Firm* — Greer, Burns & Crain, Ltd.

(57) ABSTRACT

An oil-well metal pipe according to the present disclosure includes a resin coating on or above at least one of a pin contact surface and a box contact surface. The resin coating contains: a resin: 50.0 to 99.5 mass %, a wax: 0 to 10.0 mass %, a fluorine-based additive: 0 to 30.0 mass %, graphite: 0 to 10.0 mass %, a rust preventive pigment: 0 to 30.0 mass %, a coloring pigment: 0 to 10.0 mass %, a coupling agent: 0 to 10.0 mass %, and one type or two types selected from (Continued)

a group consisting of a magnesium silicate hydroxide powder: 1.5 to 50.0 mass % and $TiO_2$: 0.5 to 30.0 mass %; and satisfies Formula (1).

$$(W+F+G)/(M+T) \leq 5.00 \qquad (1)$$

3 Claims, 6 Drawing Sheets

(51) Int. Cl.
    *C09D 7/61*    (2018.01)
    *C09D 163/00*   (2006.01)
    *C09D 175/04*   (2006.01)
    *F16B 7/18*    (2006.01)
    *F16L 15/04*   (2006.01)

(56) References Cited

U.S. PATENT DOCUMENTS

| | | | |
|---|---|---|---|
| 2008/0129044 A1* | 6/2008 | Carcagno | F16L 58/182 |
| | | | 285/119 |
| 2010/0167968 A1* | 7/2010 | Pinel | F16L 57/06 |
| | | | 285/94 |
| 2010/0301600 A1* | 12/2010 | Goto | C10M 169/044 |
| | | | 285/333 |
| 2011/0084483 A1* | 4/2011 | Nunez | E21B 17/042 |
| | | | 427/258 |
| 2013/0276294 A1 | 10/2013 | Goto et al. | |
| 2015/0001841 A1* | 1/2015 | Oshima | F16L 15/004 |
| | | | 285/94 |
| 2017/0138526 A1* | 5/2017 | Goto | C10M 111/04 |
| 2018/0201868 A1* | 7/2018 | Goto | F16L 15/08 |
| 2018/0274703 A1* | 9/2018 | Goto | C08K 3/04 |
| 2021/0364119 A1* | 11/2021 | Goto | C10M 147/02 |

FOREIGN PATENT DOCUMENTS

| | | |
|---|---|---|
| EP | 3258151 A1 | 12/2017 |
| JP | H03268940 A | 11/1991 |
| JP | 2003021278 A | 1/2003 |
| JP | 2010511135 A | 4/2010 |
| JP | 2014501885 A | 1/2014 |
| WO | 2006058227 A1 | 6/2006 |
| WO | 2006104251 A1 | 10/2006 |
| WO | 2015141159 A1 | 9/2015 |

* cited by examiner

OIL-WELL METAL PIPE

TECHNICAL FIELD

The present disclosure relates to a metal pipe, and more particularly relates to an oil-well metal pipe.

BACKGROUND ART

An oil-well metal pipe is used for drilling in oil fields and natural gas fields (hereinafter, oil fields and natural gas fields are collectively referred to as "oil wells"). An oil-well metal pipe has threaded connections. Specifically, at the oil well drilling site, in accordance with the depth of the oil well, a plurality of oil-well metal pipes are connected to form an oil country tubular goods connected body as typified by a casing pipe or a tubing pipe. An oil country tubular goods connected body is formed by fastening oil-well metal pipes to each other. Inspections are sometimes conducted on oil country tubular goods connected bodies. When conducting an inspection, the oil country tubular goods connected body is lifted up and loosened. oil-well metal pipes are then detached from the oil country tubular goods connected body by loosening, and inspected. After the inspection, the threaded connections of the oil-well metal pipes are refastened to each other, and the oil-well metal pipes are reused as a part of the oil country tubular goods connected body.

An oil-well metal pipe includes a pin and a box. The pin has a pin contact surface including an external thread part on an outer peripheral surface of an end portion of the oil-well metal pipe. The box has a box contact surface including an internal thread part on an inner peripheral surface of an end portion of the oil-well metal pipe. In the present description, the external thread part and the internal thread part may also be collectively referred to as "thread parts". Note that, in some cases the pin contact surface may also include a pin unthreaded metal contact portion including a pin sealing surface and a pin shoulder surface. Likewise, in some cases the box contact surface may also include a box unthreaded metal contact portion including a box sealing surface and a box shoulder surface.

The pin contact surface and the box contact surface repeatedly experience strong friction during fastening and loosening of the oil-well metal pipe. Therefore, galling (unrepairable galling) is liable to occur at the pin contact surface and the box contact surface during repeated fastening and loosening. Accordingly, an oil-well metal pipe is required to have sufficient durability with respect to friction, that is, to have excellent galling resistance.

Heretofore, heavy metal powder-containing compound greases, which are referred to as "dopes", have been used to improve the galling resistance of an oil-well metal pipe. Application of a compound grease to the pin contact surface and/or the box contact surface can improve the galling resistance of an oil-well metal pipe. However, heavy metal powder contained in compound greases, such as Pb, Zn and Cu, may affect the environment. For this reason, the development of an oil-well metal pipe that is excellent in galling resistance even without the use of a compound grease is desired.

Technology for enhancing the galling resistance of an oil-well metal pipe is proposed in, for example, Japanese Patent Application Publication No. 2003-021278 (Patent Literature 1) and International Application Publication No. WO2006/104251 (Patent Literature 2).

An oil-well metal pipe disclosed in Patent Literature 1 has a threaded connection for pipes that is constituted by a pin and a box which each have a contact surface including a thread part and an unthreaded metal contact portion. And further, the oil-well metal pipe has a solid lubricant coating composed of a solid lubricant and a binder on the contact surface of at least one of the pin and the box. Moreover, in a cross section in the thickness direction of the solid lubricant coating, an area fraction of secondary particles having an equivalent area diameter within a range of 15 to 60 μm of the solid lubricant is within a range of 5 to 90%. It is described in Patent Literature 1 that by this means an oil-well metal pipe that can stably secure galling resistance and gastightness without applying a compound grease is obtained.

An oil-well metal pipe disclosed in Patent Literature 2 is a threaded connection for pipes that is constituted by a pin and a box which each include a contact surface having a thread part and an unthreaded metal contact portion. And further, a contact surface of at least one member among the pin and the box has a viscous liquid or semisolid lubricant coating, and a dry solid coating that is formed on the lubricant coating. It is described in Patent Literature 2 that by this means an oil-well metal pipe which suppresses the occurrence of rust and exhibits excellent galling resistance and gastightness without using a compound grease is obtained.

CITATION LIST

Patent Literature

Patent Literature 1: Japanese Patent Application Publication No. 2003-021278
Patent Literature 2: International Application Publication No. WO2006/104251

SUMMARY OF INVENTION

Technical Problem

In this connection, a vertical wellbore that is drilled vertically and an inclined wellbore that is drilled while being caused to incline are usually employed in drilling for oil and natural gas. On the other hand, horizontal drilling is available as one method of drilling for oil and natural gas. The term "horizontal drilling" refers to a method in which an oil well for which drilling proceeded vertically is gradually curved in the horizontal direction, and eventually is drilled horizontally along the storage reservoir of the oil or natural gas. In comparison to a usual vertical wellbore or inclined wellbore, a horizontal wellbore can contact a greater amount of a storage reservoir of oil or natural gas, and the amount of production of oil or natural gas per unit wellbore increases. In recent years, the use of horizontal drilling for oil and natural gas excavation is increasing. Accordingly, there is a demand for an oil-well metal pipe that can also be used for horizontal drilling.

In horizontal drilling, oil country tubular goods connected body bend when the drilling direction changes from vertical to horizontal. In the case of horizontal drilling, the drilling advances to a deep part of the storage reservoir of oil or natural gas while causing the oil country tubular goods connected body to bend and to rotate in the circumferential direction. Therefore, particularly at a bent section of an oil country tubular goods connected body, torsion is applied to the threaded connections accompanying bending and rotation in the circumferential direction of the oil country tubular goods connected body. If torsion is applied with a high load, oil-well metal pipes are liable to loosen. In a case where the drilling direction is the vertical direction, torsion in the circumferential direction of the oil-well metal pipes is mainly applied to the oil-well metal pipes. However, in the case of horizontal drilling, in addition to torsion in the circumferential direction of the oil-well metal pipes, torsion produced by bending of the oil-well metal pipes is also applied to the oil-well metal pipes. Therefore, in comparison to drilling in the vertical direction, in the case of horizontal drilling the oil-well metal pipes are subjected to the application of additional excessive torsion. Therefore, the oil-well metal pipes are more liable to loosen.

Therefore, if an oil-well metal pipe can be fastened with an even higher torque than heretofore, it will be difficult for the threaded connection to loosen. Hence, it will also be difficult for the threaded connection to loosen at a bent section of the oil country tubular goods connected body during horizontal drilling.

An objective of the present disclosure is to provide an oil-well metal pipe which has a high shear strength.

Solution to Problem

An oil-well metal pipe according to the present disclosure includes:
a pipe main body including a first end portion and a second end portion,
wherein:
the pipe main body includes:
a pin formed at the first end portion, and
a box formed at the second end portion;
the pin includes:
a pin contact surface including an external thread part; and
the box includes:
a box contact surface including an internal thread part;
the oil-well metal pipe further including:
a resin coating on or above at least one of the pin contact surface and the box contact surface;
the resin coating containing:
a resin: 50.0 to 99.5 mass %,
a wax: 0 to 10.0 mass %,
a fluorine-based additive: 0 to 30.0 mass %,
graphite: 0 to 10.0 mass %,
a rust preventive pigment: 0 to 30.0 mass %,
a coloring pigment: 0 to 10.0 mass %,
a coupling agent: 0 to 10.0 mass %, and
one type or two types selected from a group consisting of a magnesium silicate hydroxide powder: 1.5 to 50.0 mass % and $TiO_2$: 0.5 to 30.0 mass %;
and satisfying Formula (1):

$$(W+F+G)/(M+T) \leq 5.00 \qquad (1)$$

where, in Formula (1), a content in mass % of the wax is substituted for W, a content in mass % of the fluorine-based additive is substituted for F, a content in mass % of the graphite is substituted for G, a content in mass % of the magnesium silicate hydroxide powder is substituted for M, and a content in mass % of the $TiO_2$ is substituted for T.

Advantageous Effects of Invention

The oil-well metal pipe according to the present disclosure has high shear strength.

DESCRIPTION OF EMBODIMENTS

The present embodiment will be described in detail below with reference to the accompanying drawings. The same reference symbols will be used throughout the drawings to refer to the same or like parts, and description thereof will not be repeated.

First, the present inventors conducted studies regarding an oil-well metal pipe which can be applied as an oil country tubular good for use in horizontal drilling, and which can be fastened with higher torque than a conventional oil-well metal pipe. As a result, the present inventors obtained the following findings.

As described above, an oil country tubular goods connected body is formed by fastening the threaded connections of oil-well metal pipes together. When fastening threaded connections together, the torque rises in accordance with the number of turns. In particular, in the final stage of fastening, the torque rapidly rises. On the other hand, if the torque during fastening becomes too high, in some cases the oil-well metal pipe will yield. In the present description, the torque at a time when an oil-well metal pipes yields when being fastened is also referred to as "yield torque". The higher the yield torque is, the higher the torque with which the oil-well metal pipe can be fastened will be. In other words, the yield torque can be used as an indicator of whether or not an oil-well metal pipe can be fastened with high torque.

Heretofore, a method which increases the coefficient of friction of a resin coating formed on an oil-well metal pipes has been proposed as means for increasing the fastening torque of an oil-well metal pipe. When fastening oil-well metal pipes together, if resin coatings that each have a high coefficient of friction come in contact and slide relative to each other, it is expected that the torque of the fastening will rise. Therefore, by increasing the coefficient of friction of the resin coating, there is a possibility that the yield torque will also be increased. Therefore, the present inventors included a magnesium silicate hydroxide powder that is a solid powder and/or $TiO_2$ in a resin coating, adjusted the coefficient of friction of the resin coating, and investigated the relation between the coefficient of friction and the yield torque.

Figure 1:
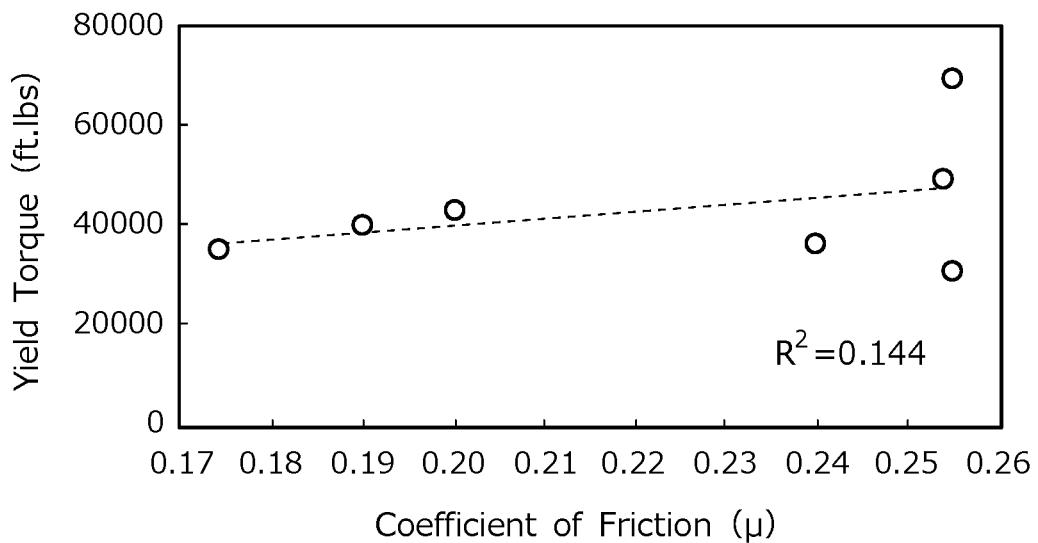
FIG. 1 is a view illustrating the relation between the coefficient of friction of a resin coating and yield torque.

FIG. 1 is a view illustrating the relation between the coefficient of friction of a resin coating and the yield torque. The abscissa in FIG. 1 represents the coefficient of friction (u) of the resin coating. The ordinate in FIG. 1 represents the yield torque (ft. lbs.) in a case where an oil-well metal pipe on which the resin coating was formed was fastened. Referring to FIG. 1, a correlation coefficient $R^2$ between the coefficient of friction of the resin coating and the yield torque was 0.144. Based on this result, almost no positive correlation is recognized between the coefficient of friction of the resin coating and the yield torque. That is, contrary to the expectation of the present inventors, it was revealed that the correlation between the coefficient of friction and the yield torque is weak. In short, the result of the investigation conducted by the present inventors revealed that the yield torque cannot be effectively raised by simply increasing the coefficient of friction of the resin coating.

Therefore, the present inventors conducted further studies with respect to an oil-well metal pipe which can be fastened with high torque. First, the present inventors focused their attention on the behavior of a resin coating in the final stage of fastening. In the final stage of fastening, resin coatings come in contact with each other with high interfacial pressure and slide. The present inventors considered that at such time each resin coating receives a force that slidingly cuts (shear force) from the pin contact surface and the box contact surface. If the resin coating receives a shear force that is more than the shear strength of the resin coating, the resin coating will be fractured. As a result, there is a possibility that the oil-well metal pipe will be liable to yield.

Figure 2:
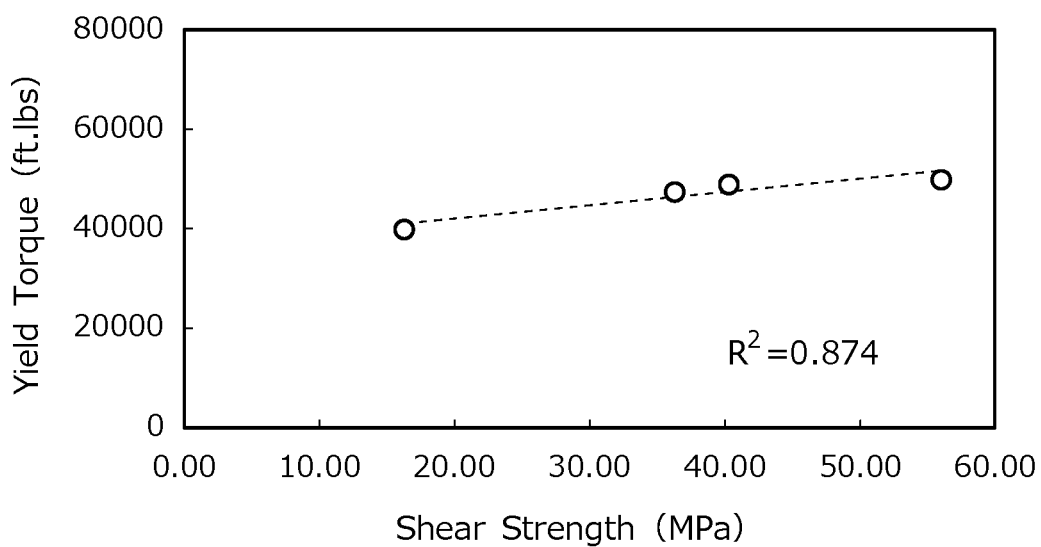
FIG. 2 is a view illustrating the relation between the shear strength of a resin coating and yield torque.

In other words, the present inventors considered that if the shear strength of the resin coating is increased, there is a possibility that the yield torque of the oil-well metal pipe will rise. Therefore the present inventors studied in detail the relation between the shear strength of the resin coating and the yield torque of the oil-well metal pipe. FIG. 2 is a view illustrating the relation between the shear strength of the resin coating and the yield torque. The abscissa in FIG. 2 represents the shear strength (MPa) of the resin coating. The ordinate in FIG. 2 represents the yield torque (ft. lbs.) in a case where an oil-well metal pipe on which the resin coating was formed was fastened.

Referring to FIG. 2, a correlation coefficient $R^2$ between the shear strength of the resin coating and the yield torque was 0.874. Based on this result, a strong positive correlation is recognized between the shear strength of the resin coating and the yield torque. That is, the result of the detailed studies of the present inventors revealed that if the shear strength of the resin coating is increased, the yield torque of the oil-well metal pipe is effectively raised.

Next, the present inventors conducted studies regarding a method for increasing the shear strength of a resin coating. As a result, the present inventors found that if a magnesium silicate hydroxide powder that is a solid powder and/or $TiO_2$ is contained, there is a possibility that the shear strength of the resin coating will increase. Therefore, the present inventors investigated in detail the shear strength of a resin coating containing a magnesium silicate hydroxide powder and/or $TiO_2$.

First, the present inventors focused their attention on the components contained in a resin coating, and conducted studies with respect to means for increasing the shear strength. As a result, the present inventors considered that if a resin coating contains a resin: 50.0 to 99.5 mass %, a wax: 0 to 10.0 mass %, a fluorine-based additive: 0 to 30.0 mass %, graphite: 0 to 10.0 mass %, a rust preventive pigment: 0 to 30.0 mass %, a coloring pigment: 0 to 10.0 mass %, a coupling agent: 0 to 10.0 mass % and one type or two types selected from a group consisting of magnesium silicate hydroxide powder: 1.5 to 50.0 mass % and $TiO_2$: 0.5 to 30.0 mass %, there is a possibility of increasing the shear strength. The results of detailed studies of the present inventors further revealed that, on the premise that the resin coating contains the aforementioned components, the shear strength of the resin coating is increased if the resin coating satisfies the following Formula (1):

$$(W+F+G)/(M+T) \leq 5.00 \quad (1)$$

where, in Formula (1), the content in mass % of the wax is substituted for W, the content in mass % of the fluorine-based additive is substituted for F, the content in mass % of the graphite is substituted for G, the content in mass % of the magnesium silicate hydroxide powder is substituted for M, and the content in mass % of the $TiO_2$ is substituted for T.

Figure 3:
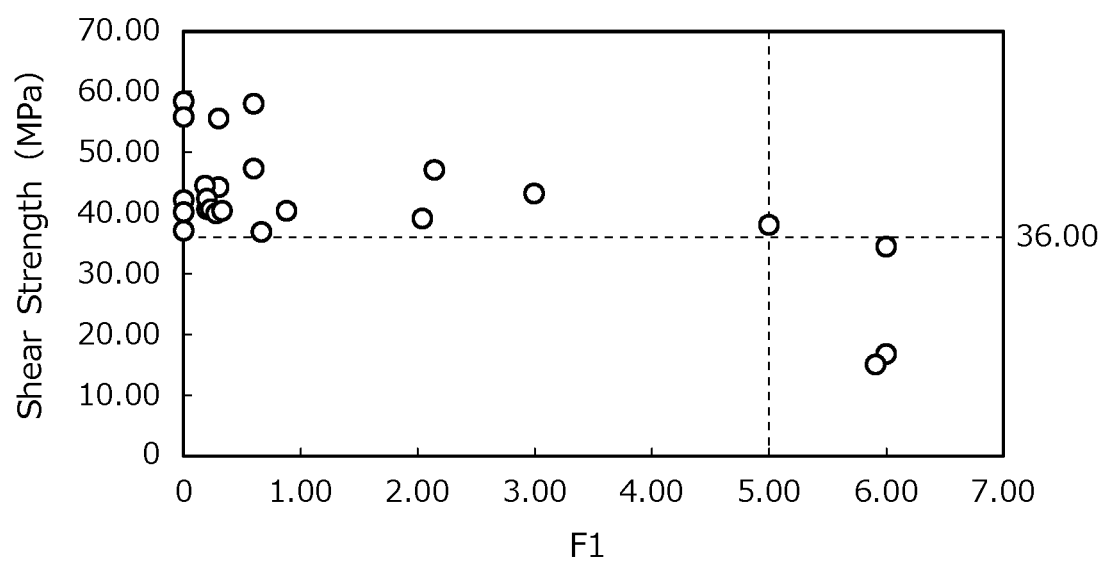
FIG. 3 is a view illustrating the relation between F1 (=(W+F+G)/(M+T)) and the shear strength of a resin coating.

In the present description, it is defined that $F1=(W+F+G)/(M+T)$. FIG. 3 is a view illustrating the relation between F1 for the resin coating and the shear strength of the resin coating. FIG. 3 is an extract of one part of the results of examples which are described later. The abscissa in FIG. 3 represents F1. The ordinate in FIG. 3 represents the shear strength (MPa) of the resin coating. Referring to FIG. 3, if F1 is 5.00 or less, the shear strength of the resin coating becomes 36.00 MPa or more. With regard to the reason for this, although the details have not been clarified, the present inventors surmise that the reason is as follows.

In a resin coating having the aforementioned composition, magnesium silicate hydroxide is a particle with a high shear strength in the crystals. In addition, in a resin coating having the aforementioned composition, $TiO_2$ is a hard particle. If these components are contained in a large amount in the resin coating, if the resin coating is subjected to a shear force, the particles themselves resist shearing and suppress the occurrence of shear fracture of the resin coating. That is, it is considered that the higher the contents of the magnesium silicate hydroxide powder and $TiO_2$ are, the higher the shear strength of the resin coating becomes. In contrast, a wax, a fluorine-based additive and graphite lower the hardness of the resin coating. Therefore, it is considered that the higher the contents of a wax, a fluorine-based additive and graphite are, the lower the shear strength of the resin coating becomes. Therefore, the present inventors surmise that the shear strength is increased by making the ratio of the total content of a wax, a fluorine-based additive and graphite to the total content of a magnesium silicate hydroxide powder and $TiO_2$ small.

Thus, in contrast to the conventional findings, it was revealed that the yield torque cannot be effectively raised by simply increasing the coefficient of friction of a resin coating, and that the yield torque is effectively raised only after the shear strength of the resin coating is increased. In addition, it was revealed that the shear strength of the resin coating is increased only when the content of each component in the resin coating is adjusted so as to satisfy Formula (1). By increasing the shear strength of the resin coating to raise the yield torque, an oil-well metal pipe that can also be used for horizontal drilling is obtained. The oil-well metal pipe of the present disclosure was completed based on the above findings, and has the following structure.

[1]

An oil-well metal pipe, including:
a pipe main body including a first end portion and a second end portion,
wherein:
the pipe main body includes:
a pin formed at the first end portion, and
a box formed at the second end portion;
the pin includes:
a pin contact surface including an external thread part; and
the box includes:
a box contact surface including an internal thread part;
the oil-well metal pipe further including:
a resin coating on or above at least one of the pin contact surface and the box contact surface;
the resin coating containing:
a resin: 50.0 to 99.5 mass %,
a wax: 0 to 10.0 mass %,
a fluorine-based additive: 0 to 30.0 mass %,
graphite: 0 to 10.0 mass %,
a rust preventive pigment: 0 to 30.0 mass %,
a coloring pigment: 0 to 10.0 mass %,
a coupling agent: 0 to 10.0 mass %, and
one type or two types selected from a group consisting of a magnesium silicate hydroxide powder: 1.5 to 50.0 mass % and $TiO_2$: 0.5 to 30.0 mass %;
and satisfying Formula (1):

$$(W+F+G)/(M+T) \leq 5.00 \quad (1)$$

where, in Formula (1), a content in mass % of the wax is substituted for W, a content in mass % of the fluorine-based additive is substituted for F, a content in mass % of the graphite is substituted for G, a content in mass % of the magnesium silicate hydroxide powder is substituted for M, and a content in mass % of the $TiO_2$ is substituted for T.

[2]

The oil-well metal pipe according to claim [1], wherein:
the resin is one type or two types selected from a group consisting of epoxy resin and urethan resin.

[3]

The oil-well metal pipe according to [1] or [2], wherein:
the pin contact surface further includes a pin sealing surface and a pin shoulder surface, and
the box contact surface further includes a box sealing surface and a box shoulder surface.

Hereunder, the oil-well metal pipe according to the present embodiment will be described in detail.

[Structure of Oil-Well Metal Pipe]

First, the structure of the oil-well metal pipe of the present embodiment will be described. The oil-well metal pipe has a well-known structure. The available types of oil-well metal pipe are a T&C type oil-well metal pipe and an integral type oil-well metal pipe. Hereunder, each type of oil-well metal pipe will be described in detail.

[Case where Oil-Well Metal Pipe 1 is T&C Type]

Figure 4:
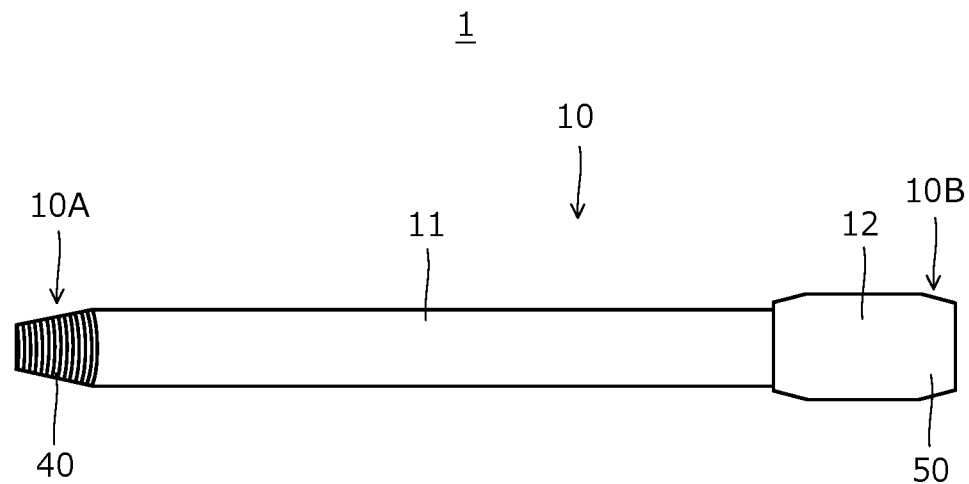
FIG. 4 is a configuration diagram illustrating one example of an oil-well metal pipe according to the present embodiment.

FIG. 4 is a configuration diagram illustrating one example of an oil-well metal pipe 1 according to the present embodiment. FIG. 4 is a configuration diagram illustrating the oil-well metal pipe 1 of a so-called T&C (threaded and coupled) type. Referring to FIG. 4, the oil-well metal pipe 1 includes a pipe main body 10.

The pipe main body 10 extends in the pipe axis direction. A cross section perpendicular to the pipe axis direction of the pipe main body 10 is a circular shape. The pipe main body 10 includes a first end portion 10A and a second end portion 10B. The first end portion 10A is an end portion on the opposite side to the second end portion 10B. In the T&C type oil-well metal pipe 1 illustrated in FIG. 4, the pipe main body 10 includes a pin tube body 11 and a coupling 12. The coupling 12 is attached to one end of the pin tube body 11. More specifically, the coupling 12 is fastened by threading to one end of the pin tube body 11.

Figure 5:
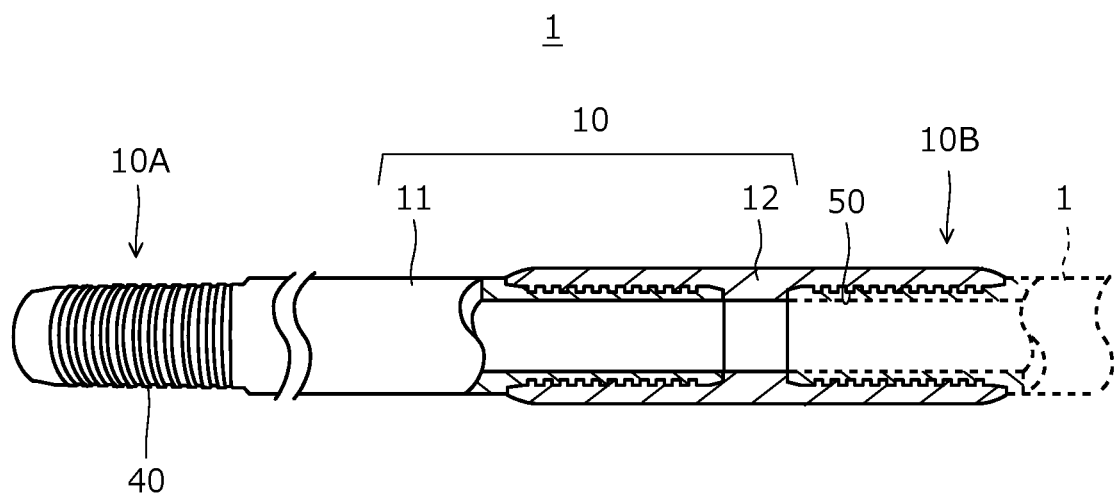
FIG. 5 is a partial cross-sectional view illustrating a cross section (longitudinal cross section) parallel to a pipe axis direction of a coupling of the oil-well metal pipe illustrated in FIG. 4.

FIG. 5 is a partial cross-sectional view illustrating a cross section (longitudinal cross section) that is parallel to the pipe axis direction of the coupling 12 of the oil-well metal pipe 1 illustrated in FIG. 4. Referring to FIG. 4 and FIG. 5, the pipe main body 10 includes a pin 40 and a box 50. The pin 40 is formed at the first end portion 10A of the pipe main body 10. When performing fastening, the pin 40 is inserted into the box 50 of another oil-well metal pipe 1 (not illustrated), and is fastened by threading to the box 50 of the other oil-well metal pipe 1.

The box 50 is formed at the second end portion 10B of the pipe main body 10. When performing fastening, the pin 40 of another oil-well metal pipe 1 is inserted into the box 50, and the box 50 is fastened by threading to the pin 40 of the other oil-well metal pipe 1.

[Regarding Structure of Pin 40]

Figure 6:
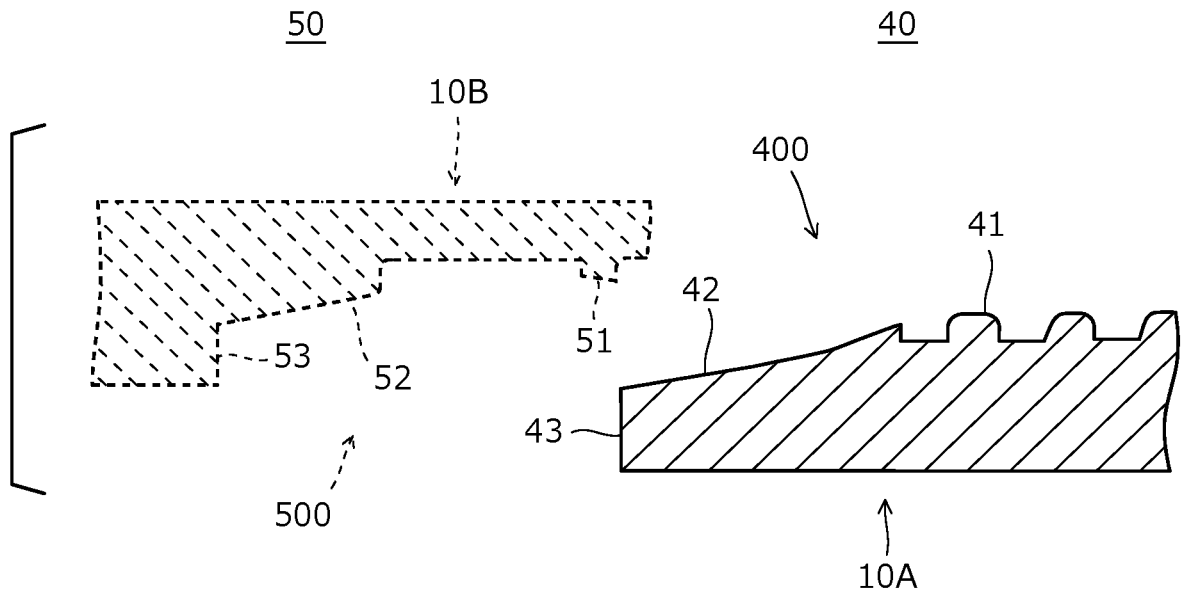
FIG. 6 is a cross-sectional view parallel to the pipe axis direction of the oil-well metal pipe illustrated in FIG. 5, that illustrates a portion in the vicinity of a pin of the oil-well metal pipe.

FIG. 6 is a cross-sectional view of a portion in the vicinity of the pin 40 of the oil-well metal pipe 1 illustrated in FIG. 5, that is a cross-sectional view parallel to the pipe axis direction of the oil-well metal pipe 1. A dashed line portion in FIG. 6 represents the structure of the box 50 of another oil-well metal pipe in the case of fastening the oil-well metal pipe 1 to another oil-well metal pipe 1. Referring to FIG. 6, the pin 40 includes a pin contact surface 400 on the outer peripheral surface of the first end portion 10A of the pipe main body 10. When fastening to the other oil-well metal pipe 1, the pin contact surface 400 is screwed into the box 50 of the other oil-well metal pipe 1 and contacts a box contact surface 500 (described later) of the box 50.

The pin contact surface 400 includes at least an external thread part 41 formed in the outer peripheral surface of the first end portion 10A. The pin contact surface 400 may further include a pin sealing surface 42 and a pin shoulder surface 43. In FIG. 6, the pin shoulder surface 43 is disposed at the front end face of the first end portion 10A, and on the outer peripheral surface of the first end portion 10A, the pin sealing surface 42 is disposed further on the front end side of the first end portion 10A than the external thread part 41. In other words, the pin sealing surface 42 is disposed between the external thread part 41 and the pin shoulder surface 43. The pin sealing surface 42 is provided in a tapered shape. Specifically, the external diameter of the pin sealing surface 42 gradually decreases from the external thread part 41 toward the pin shoulder surface 43 in the longitudinal direction (pipe axis direction) of the first end portion 10A.

When performing fastening with another oil-well metal pipe 1, the pin sealing surface 42 contacts a box sealing surface 52 (described later) of the box 50 of the other oil-well metal pipe 1. More specifically, during fastening, when the pin 40 is inserted into the box 50 of the other oil-well metal pipe 1, the pin sealing surface 42 contacts the box sealing surface 52. Subsequently, when the pin 40 is screwed further into the box 50 of the other oil-well metal pipe 1, the pin sealing surface 42 closely contacts the box sealing surface 52. By this means, during fastening, the pin sealing surface 42 closely contacts the box sealing surface 52 to thereby form a seal that is based on metal-to-metal contact. Therefore, the gastightness can be increased in each of the oil-well metal pipes 1 that are fastened to each other.

In FIG. 6, the pin shoulder surface 43 is disposed at the front end face of the first end portion 10A. In other words, in the pin 40 illustrated in FIG. 6, the external thread part 41, the pin sealing surface 42 and the pin shoulder surface 43 are disposed sequentially in that order from the center of the pipe main body 10 toward the first end portion 10A. During fastening to the other oil-well metal pipe 1, the pin shoulder surface 43 opposes and contacts a box shoulder surface 53 (described later) of the box 50 of the other oil-well metal pipe 1. More specifically, during fastening, the pin shoulder surface 43 contacts the box shoulder surface 53 as a result of the pin 40 being inserted into the box 50 of the other oil-well metal pipe 1. By this means, during fastening, a high torque can be obtained. Further, the positional relation between the pin 40 and the box 50 in the fastening state can be stabilized.

Note that, the pin contact surface 400 of the pin 40 includes at least the external thread part 41. In other words, the pin contact surface 400 includes the external thread part 41, and need not include the pin sealing surface 42 and the pin shoulder surface 43. The pin contact surface 400 may include the external thread part 41 and the pin shoulder surface 43, and need not include the pin sealing surface 42. The pin contact surface 400 may include the external thread part 41 and the pin sealing surface 42, and need not include the pin shoulder surface 43.

[Regarding Structure of Box 50]

Figure 7:
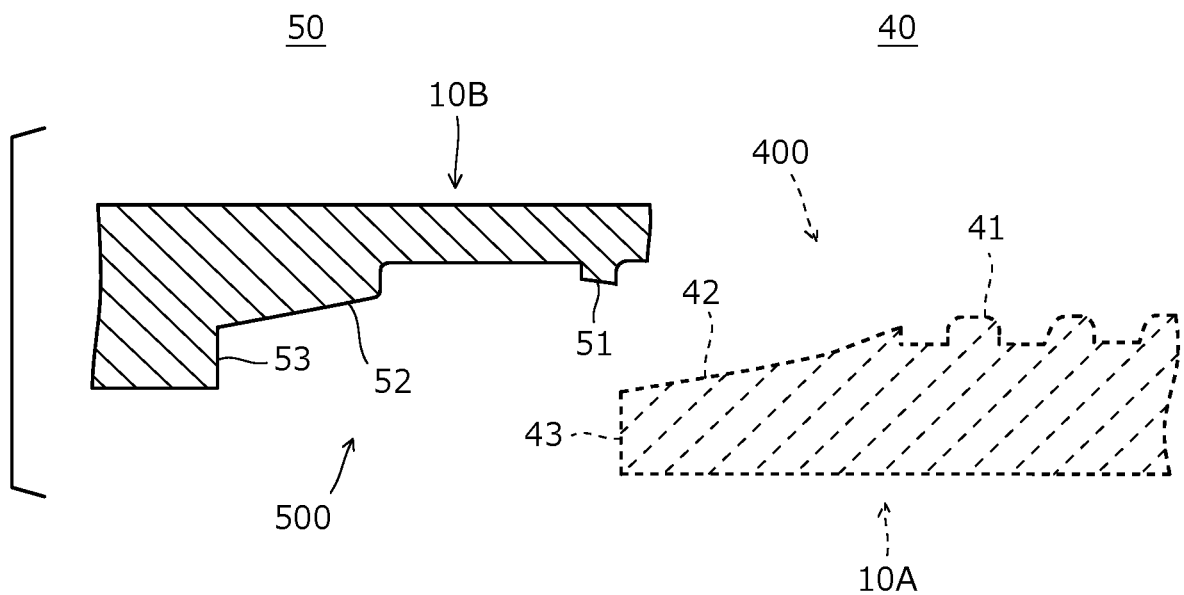
FIG. 7 is a cross-sectional view parallel to the pipe axis direction of the oil-well metal pipe illustrated in FIG. 5, that illustrates a portion in the vicinity of a box of the oil-well metal pipe.

FIG. 7 is a cross-sectional view of a portion in the vicinity of the box 50 of the oil-well metal pipe 1 illustrated in FIG. 5, that is a cross-sectional view parallel to the pipe axis direction of the oil-well metal pipe 1. A dashed line portion in FIG. 7 represents the structure of the pin 40 of another oil-well metal pipe 1 in the case of fastening the oil-well metal pipe 1 to another oil-well metal pipe 1. Referring to FIG. 7, the box 50 includes a box contact surface 500 on the inner peripheral surface of the second end portion 10B of the pipe main body 10. When performing fastening to another oil-well metal pipe 1, the box contact surface 500 contacts the pin contact surface 400 of the pin 40 of the other oil-well metal pipe 1 when the pin 40 is screwed into the box 50.

The box contact surface 500 includes at least an internal thread part 51 formed in the inner peripheral surface of the second end portion 10B. When performing fastening, the internal thread part 51 engages with the external thread part 41 of the pin 40 of the other oil-well metal pipe 1.

The box contact surface 500 may further include the box sealing surface 52 and the box shoulder surface 53. In FIG. 7, on the inner peripheral surface of the second end portion 10B, the box sealing surface 52 is disposed further on the pipe main body 10 side than the internal thread part 51. In other words, the box sealing surface 52 is disposed between the internal thread part 51 and the box shoulder surface 53. The box sealing surface 52 is provided in a tapered shape.

Specifically, the internal diameter of the box sealing surface 52 gradually decreases from the internal thread part 51 toward the box shoulder surface 53 in the longitudinal direction (pipe axis direction) of the second end portion 10B.

When performing fastening to another oil-well metal pipe 1, the box sealing surface 52 contacts the pin sealing surface 42 of the pin 40 of the other oil-well metal pipe 1. More specifically, during fastening, when the pin 40 of the other oil-well metal pipe 1 is screwed into the box 50, the box sealing surface 52 contacts the pin sealing surface 42, and when the pin 40 is screwed in further, the box sealing surface 52 closely contacts the pin sealing surface 42. By this means, during fastening, the box sealing surface 52 closely contacts the pin sealing surface 42 to thereby form a seal that is based on metal-to-metal contact. Therefore, the gastightness can be increased in each of the oil-well metal pipes 1 that are fastened to each other.

The box shoulder surface 53 is disposed further on the pipe main body 10 side than the box sealing surface 52. In other words, in the box 50, the box shoulder surface 53, the box sealing surface 52 and the internal thread part 51 are disposed sequentially in that order from the center of the pipe main body 10 toward the front end of the second end portion 10B. When performing fastening to another oil-well metal pipe 1, the box shoulder surface 53 opposes and contacts the pin shoulder surface 43 of the pin 40 of the other oil-well metal pipe 1. More specifically, during fastening, the box shoulder surface 53 contacts the pin shoulder surface 43 as a result of the pin 40 of the other oil-well metal pipe 1 being inserted into the box 50. By this means, during fastening, a high torque can be obtained. Further, the positional relation between the pin 40 and the box 50 in the fastening state can be stabilized.

The box contact surface 500 includes at least the internal thread part 51. When performing fastening, the internal thread part 51 of the box contact surface 500 of the box 50 contacts the external thread part 41 of the pin contact surface 400 of the pin 40 in a manner such that the internal thread part 51 corresponds to the external thread part 41. The box sealing surface 52 contacts the pin sealing surface 42 in a manner such that the box sealing surface 52 corresponds to the pin sealing surface 42. The box shoulder surface 53 contacts the pin shoulder surface 43 in a manner such that the box shoulder surface 53 corresponds to the pin shoulder surface 43.

In a case where the pin contact surface 400 includes the external thread part 41 and does not include the pin sealing surface 42 and the pin shoulder surface 43, the box contact surface 500 includes the internal thread part 51 and does not include the box sealing surface 52 and the box shoulder surface 53. In a case where the pin contact surface 400 includes the external thread part 41 and the pin shoulder surface 43 and does not include the pin sealing surface 42, the box contact surface 500 includes the internal thread part 51 and the box shoulder surface 53 and does not include the box sealing surface 52. In a case where the pin contact surface 400 includes the external thread part 41 and the pin sealing surface 42 and does not include the pin shoulder surface 43, the box contact surface 500 includes the internal thread part 51 and the box sealing surface 52 and does not include the box shoulder surface 53.

The pin contact surface 400 may include a plurality of the external thread parts 41, may include a plurality of the pin sealing surfaces 42, and may include a plurality of the pin shoulder surfaces 43. For example, the pin shoulder surface 43, the pin sealing surface 42, the external thread part 41, the pin sealing surface 42, the pin shoulder surface 43, the pin sealing surface 42 and the external thread part 41 may be disposed in that order on the pin contact surface 400 of the pin 40 in the direction from the front end of the first end portion 10A toward the center of the pipe main body 10. In such case, the internal thread part 51, the box sealing surface 52, the box shoulder surface 53, the box sealing surface 52, the internal thread part 51, the box sealing surface 52 and the box shoulder surface 53 are disposed in that order on the box contact surface 500 of the box 50 in the direction from the front end of the second end portion 10B toward the center of the pipe main body 10.

Figure 8:
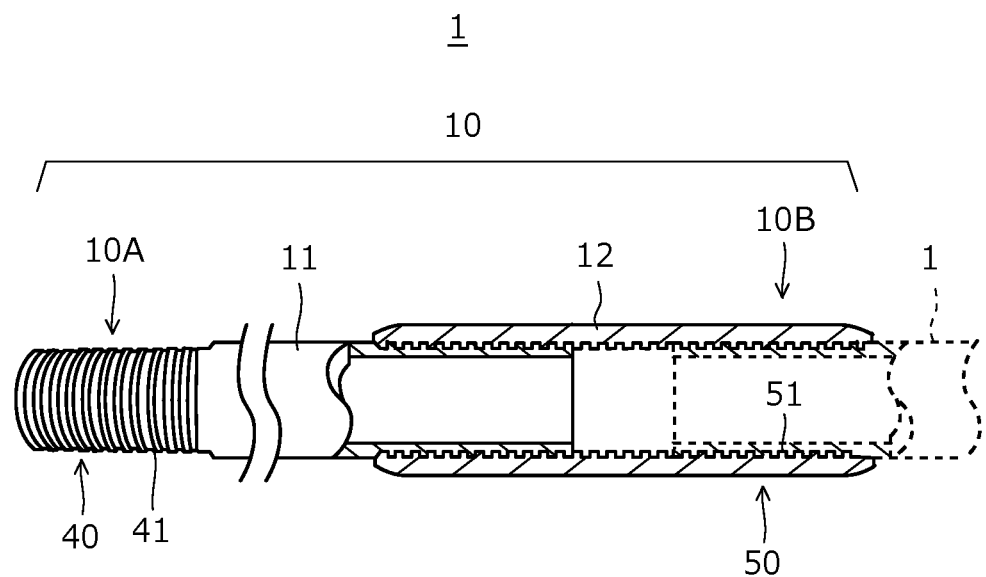
FIG. 8 is a view illustrating an example of an oil-well metal pipe in which the pin includes an external thread part but does not include a pin sealing surface and a pin shoulder surface, and the box includes an internal thread part but does not include a box sealing surface and a box shoulder surface.

In FIG. 6 and FIG. 7 a so-called "premium joint" is illustrated in which the pin 40 includes the external thread part 41, the pin sealing surface 42 and the pin shoulder surface 43, and the box 50 includes the internal thread part 51, the box sealing surface 52 and the box shoulder surface 53. However, as described above, the pin 40 may include the external thread part 41 and need not include the pin sealing surface 42 and the pin shoulder surface 43. In this case, the box 50 includes the internal thread part 51 and does not include the box sealing surface 52 and the box shoulder surface 53. FIG. 8 is a view illustrating one example of the oil-well metal pipe 1 in which the pin 40 includes the external thread part 41 and does not include the pin sealing surface 42 and the pin shoulder surface 43, and the box 50 includes the internal thread part 51 and does not include the box sealing surface 52 and the box shoulder surface 53.

[Case where Oil-Well Metal Pipe 1 is Integral Type]

The oil-well metal pipe 1 illustrated in FIG. 4, FIG. 5 and FIG. 8 is a so-called "T&C type" oil-well metal pipe 1, in which the pipe main body 10 includes the pin tube body 11 and the coupling 12. However, the oil-well metal pipe 1 according to the present embodiment may be an integral type instead of a T&C type.

Figure 9:
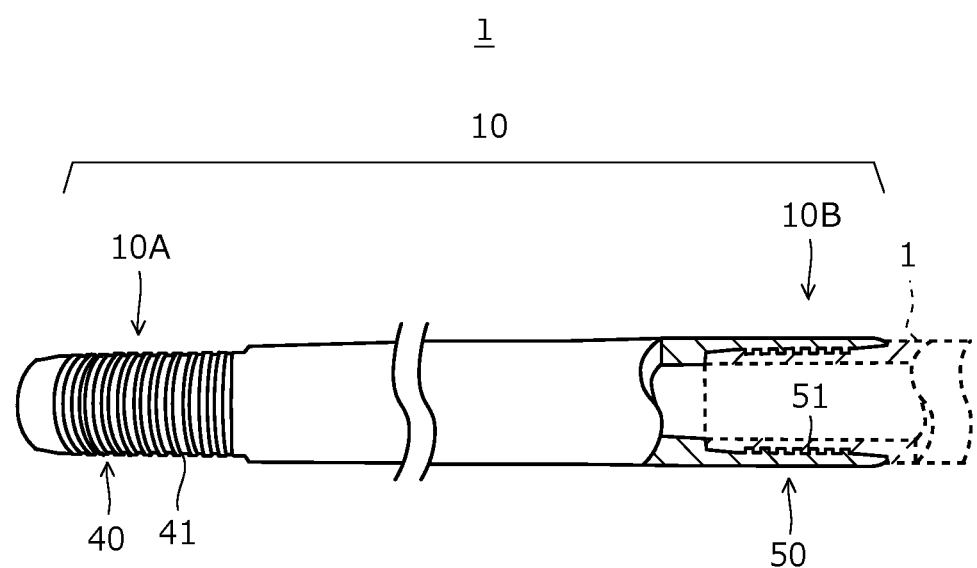
FIG. 9 is a configuration diagram illustrating an integral type oil-well metal pipe according to the present embodiment.

FIG. 9 is a configuration diagram of an integral type oil-well metal pipe 1 according to the present embodiment. Referring to FIG. 9, the integral type oil-well metal pipe 1 includes a pipe main body 10. The pipe main body 10 includes a first end portion 10A and a second end portion 10B. The first end portion 10A is disposed on the opposite side to the second end portion 10B. As described above, in the T&C type oil-well metal pipe 1, the pipe main body 10 includes the pin tube body 11 and the coupling 12. In other words, in the T&C type oil-well metal pipe 1, the pipe main body 10 is constituted by fastening two separate members (the pin tube body 11 and the coupling 12). In contrast, in the integral type oil-well metal pipe 1, the pipe main body 10 is formed in an integral manner.

The pin 40 is formed at the first end portion 10A of the pipe main body 10. When performing fastening, the pin 40 is inserted in and screwed into the box 50 of another integral type oil-well metal pipe 1, and thereby fastened to the box 50 of the other integral type oil-well metal pipe 1. The box 50 is formed at the second end portion 10B of the pipe main body 10. When performing fastening, the pin 40 of another integral type the oil-well metal pipe 1 is inserted in and screwed into the box 50, to thereby fasten the box 50 to the pin 40 of the other integral type oil-well metal pipe 1.

The structure of the pin 40 of the integral type oil-well metal pipe 1 is the same as the structure of the pin 40 of the T&C type oil-well metal pipe 1 illustrated in FIG. 6. Similarly, the structure of the box 50 of the integral type oil-well metal pipe 1 is the same as the structure of the box 50 of the T&C type oil-well metal pipe 1 illustrated in FIG. 7. Note that, in FIG. 6 and FIG. 7, the pin shoulder surface 43, the pin sealing surface 42 and the external thread part 41 in the pin 40 are disposed in that order from the front end of the first end portion 10A toward the center of the pipe main body 10. Therefore, the internal thread part 51, the box sealing surface 52 and the box shoulder surface 53 in the box 50 are disposed in that order from the front end of the second end portion 10B toward the center of the pipe main body 10. However, similarly to the pin contact surface 400 of the pin 40 of the T&C type oil-well metal pipe 1, it suffices that the pin contact surface 400 of the pin 40 of the integral type oil-well metal pipe 1 includes at least the external thread part 41. Further, similarly to the box contact surface 500 of the box 50 of the T&C type oil-well metal pipe 1, it suffices that the box contact surface 500 of the box 50 of the integral type oil-well metal pipe 1 includes at least the internal thread part 51.

In short, the oil-well metal pipe 1 of the present embodiment may be a T&C type or may be an integral type.

[Resin Coating]

Figure 10:
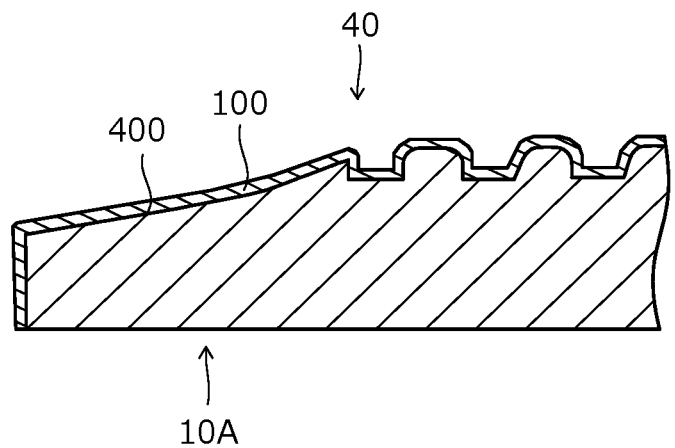
FIG. 10 is an enlarged view of a pin contact surface illustrated in FIG. 6.
Figure 11:
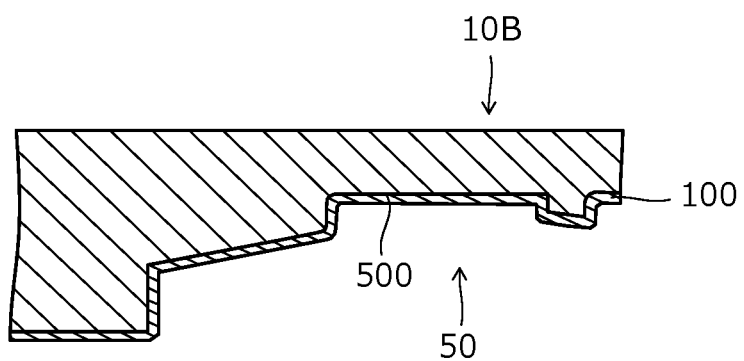
FIG. 11 is an enlarged view of a box contact surface shown in FIG. 7.

The oil-well metal pipe 1 of the present embodiment includes a resin coating 100 on or above at least one of the pin contact surface 400 and the box contact surface 500. FIG. 10 is an enlarged view of the pin contact surface 400 illustrated in FIG. 6. FIG. 11 is an enlarged view of the box contact surface 500 illustrated in FIG. 7. As illustrated in FIG. 10 and FIG. 11, the oil-well metal pipe 1 according to the present embodiment may include the resin coating 100 on or above both the pin contact surface 400 and the box contact surface 500. However, a configuration may also be adopted in which the oil-well metal pipe 1 according to the present embodiment includes the resin coating 100 on or above only one surface among the pin contact surface 400 and the box contact surface 500. For example, in a case where the resin coating 100 is provided on or above the pin contact surface 400 as illustrated in FIG. 10, the resin coating 100 need not be provided on or above the box contact surface 500. Further, in a case where the resin coating 100 is provided on or above the box contact surface 500 as illustrated in FIG. 11, the resin coating need not be provided on the pin contact surface 400. In other words, the oil-well metal pipe 1 according to the present embodiment includes the resin coating 100 on or above the pin contact surface 400 and/or on or above the box contact surface 500.

[Components of Resin Coating]

The resin coating 100 contains the following components.

Resin: 50.0 to 99.5 Mass %

A resin that is contained in the resin coating 100 according to the present embodiment is not particularly limited. However, it is considered that the resin coating 100 will be subjected to a shear force during fastening of the oil-well metal pipe 1. Therefore, in order to stably raise the yield torque of the oil-well metal pipe 1 on which the resin coating 100 is formed, the use of a resin which has a moderate hardness is preferable. From the above viewpoint, the resin contained in the resin coating 100 according to the present embodiment is one or more types selected from the group consisting of epoxy resin, phenol resin, acrylic resin, urethane resin, polyester resin, polyamide-imide resin, polyamide resin, polyimide resin, and polyether ether ketone resin. Preferably, the resin in the present embodiment is one or more types selected from the group consisting of epoxy resin, urethane resin, polyimide resin, and phenol resin, more preferably is one or more types selected from the group consisting of epoxy resin and urethane resin, and further preferably is either one type among epoxy resin and urethane resin. The resin coating 100 may contain a plurality of types of resin. In a case where the resin coating 100 contains a plurality of types of resin, the term "content of resin" means the total content of the plurality of types of resin.

The resin is the base material of the resin coating 100. Here, the term "base material" refers to the component that is contained in the largest amount in the resin coating 100. If the content of resin is too low, it will be difficult to cause a component such as a magnesium silicate hydroxide powder that is described later to disperse in the resin. As a result, the shear strength of the resin coating will decrease. On the other hand, if the content of resin is too high, other components, including a magnesium silicate hydroxide powder and/or $TiO_2$, cannot be sufficiently contained. As a result, the shear strength of the resin coating 100 will, on the contrary, decrease. Therefore, the content of resin is within a range of 50.0 to 99.5 mass %. A preferable lower limit of the content of resin is 55.0 mass %, more preferably is 60.0 mass %, and further preferably is 65.0 mass %. A preferable upper limit of the content of resin is 97.0 mass %, more preferably is 95.0 mass %, and further preferably is 90.0 mass %.

The resin coating 100 according to the present embodiment contains one type or two types selected from the group consisting of a magnesium silicate hydroxide powder and $TiO_2$. Specifically, the resin coating 100 contains one type or two types selected from the group consisting of a magnesium silicate hydroxide powder: 1.5 to 50.0 mass % and $TiO_2$: 0.5 to 30.0 mass %. Each of these components increases the shear strength of the resin coating 100.

Magnesium Silicate Hydroxide Powder: 1.5 to 50.0 Mass %

In the present embodiment, a magnesium silicate hydroxide powder is a component that is optionally contained, and it need not be contained. That is, the content of a magnesium silicate hydroxide powder may be 0 mass %. When contained, the magnesium silicate hydroxide powder increases the shear strength of the resin coating 100. The magnesium silicate hydroxide powder is a solid powder which has a layered structure. In addition, in the magnesium silicate hydroxide powder, the bonding force between the layers is high and the shear strength is high. That is, the magnesium silicate hydroxide powder is composed of particles which have a high shear strength in the crystals. Consequently, in a case where the resin coating 100 is subjected to a shear force, the magnesium silicate hydroxide powder resists shearing and suppresses the occurrence of shear fracture of the resin coating 100. It is considered that in this way magnesium silicate hydroxide powder increases the shear strength of the resin coating 100. On the other hand, if the content of the magnesium silicate hydroxide powder is too high, the content of resin will decrease relatively, and the shear strength of the resin coating 100 will, on the contrary, decrease. Therefore, when contained, the content of the magnesium silicate hydroxide powder is within a range of 1.5 to 50.0 mass %. A preferable lower limit of the content of the magnesium silicate hydroxide powder is 2.0 mass %, more preferably is 4.0 mass %, further preferably is 7.0 mass %, and more preferably is 10.0 mass %. A preferable upper limit of the content of the magnesium silicate hydroxide powder is 45.0 mass %, more preferably is 43.0 mass %, and further preferably is 40.0 mass %.

$Tio_2$: 0.5 to 30.0 Mass %

In the present embodiment, $TiO_2$ is a component that is optionally contained, and it need not be contained. That is, the content of $TiO_2$ may be 0 mass %. When contained, $TiO_2$ increases the shear strength of the resin coating 100. $TiO_2$ is a hard powder particle. Therefore, in a case where the resin coating 100 is subjected to a shear force, $TiO_2$ resists shearing and suppresses the occurrence of shear fracture of the resin coating 100. It is considered that in this way $TiO_2$ increases the shear strength of the resin coating 100. On the other hand, if the content of $TiO_2$ is too high, it will promote abrasive wear, and may cause the galling resistance of the oil-well metal pipe 1 to decrease. Therefore, when contained, the content of $TiO_2$ is within a range of 0.5 to 30.0 mass %. A preferable lower limit of the content of $TiO_2$ is 0.7 mass %, more preferably is 1.0 mass %, further preferably is 2.0 mass %, more preferably is 2.5 mass %, and further preferably is 5.0 mass %. A preferable upper limit of the content of $TiO_2$ is 25.0 mass %, more preferably is 20.0 mass %, and further preferably is 15.0 mass %.

Wax: 0 to 10.0 Mass %

The type of wax contained in the resin coating 100 according to the present embodiment is not particularly limited. The wax is, for example, one or more types selected from a group consisting of animal waxes, vegetable waxes, mineral waxes, and synthetic waxes. More specifically, the wax is one or more types selected from a group consisting of bees wax, spermaceti wax, (the foregoing are animal waxes), Japan wax, carnauba wax, candelilla wax and rice wax (the foregoing are vegetable waxes), paraffin wax, microcrystalline wax, petrolatum, montan wax, ozocerite and ceresin (the foregoing are mineral waxes), oxidized wax, polyethylene wax, polypropylene wax, Fischer-Tropsch wax, amide wax and hydrogenated castor oil (castor wax) (the foregoing are synthetic waxes). More preferably, the wax is one type or two types selected from the group consisting of polyethylene wax and polypropylene wax. The resin coating 100 may contain a plurality of types of wax. In a case where the resin coating 100 contains a plurality of types of wax, the term "content of wax" means the total content of the plurality of types of wax.

In the present embodiment, wax is a component that is optionally contained, and it need not be contained. That is, the content of wax may be 0 mass %. When contained, wax increases the lubricity of the resin coating 100. If even a small amount of wax is contained, the aforementioned effect is obtained to a certain extent. On the other hand, if the content of wax is too high, the hardness of the resin coating 100 will decrease. As a result, the shear strength of the resin coating 100 will decrease. Therefore, the content of wax is within a range of 0 to 10.0 mass %. A preferable lower limit of the content of wax is 0.1 mass %, more preferably is 0.5 mass %, further preferably is 1.0 mass %, and more preferably is 2.0 mass %. A preferable upper limit of the content of wax is 9.0 mass %, more preferably is 8.0 mass %, and further preferably is 7.5 mass %.

Fluorine-Based Additive: 0 to 30.0 Mass %

In the present description, additives containing fluorine are referred to collectively as "fluorine-based additive". The fluorine-based additive is, for example, one type or two types selected from the group consisting of perfluoropolyether (PFPE) and polytetrafluoroethylene (PTFE). The resin coating 100 may contain a plurality of types of fluorine-based additive. In a case where the resin coating 100 contains a plurality of types of fluorine-based additive, the term "content of the fluorine-based additive" means the total content of the plurality of types of fluorine-based additive.

In the present embodiment, a fluorine-based additive is a component that is optionally contained, and it need not be contained. That is, the content of the fluorine-based additive may be 0 mass %. When contained, the fluorine-based additive increases the lubricity of the resin coating 100. If even a small amount of the fluorine-based additive is contained, the aforementioned effect is obtained to a certain extent. On the other hand, if the content of the fluorine-based additive is too high, the hardness of the resin coating 100 will decrease. As a result, the shear strength of the resin coating 100 may decrease. Therefore, the content of the fluorine-based additive is within a range of 0 to 30.0 mass %. A preferable lower limit of the content of the fluorine-based additive is 1.0 mass %, more preferably is 3.0 mass %, further preferably is 4.5 mass %, and more preferably is 7.5 mass %. A preferable upper limit of the content of the fluorine-based additive is 25.0 mass %, more preferably is 20.0 mass %, further preferably is 15.0 mass %, and more preferably is 12.5 mass %.

Graphite: 0 to 10.0 mass %

In the present embodiment, graphite is a component that is optionally contained, and it need not be contained. That is, the content of graphite may be 0 mass %. When contained, graphite increases the lubricity of the resin coating 100. If even a small amount of graphite is contained, the aforementioned effect is obtained to a certain extent. On the other hand, if the content of graphite is too high, the hardness of the resin coating 100 will decrease. As a result, the shear strength of the resin coating 100 may decrease. Therefore, the content of graphite is within a range of 0 to 10.0 mass %. A preferable lower limit of the content of graphite is 1.0 mass %, more preferably is 2.0 mass %, and further preferably is 3.0 mass %. A preferable upper limit of the content of graphite is 9.0 mass %, more preferably is 8.0 mass %, and further preferably is 7.0 mass %.

Rust Preventive Pigment: 0 to 30.0 Mass %

In the present embodiment, the rust preventive pigment is not particularly limited as long as it is a well-known pigment that increases the anti-rust properties of the resin coating 100. The rust preventive pigment is, for example, one or more types selected from a group consisting of zinc phosphate, aluminum tripolyphosphate, aluminum phosphite, a metal soap of a carboxylic acid, and a sulfonate. The resin coating 100 may contain a plurality of types of rust preventive pigment. In a case where the resin coating 100 contains a plurality of types of rust preventive pigment, the term "content of the rust preventive pigment" means the total content of the plurality of types of rust preventive pigment.

In the present embodiment, a rust preventive pigment is a component that is optionally contained, and it need not be contained. That is, the content of the rust preventive pigment may be 0 mass %. When contained, the rust preventive pigment increases the anti-rust properties of the resin coating 100. If even a small amount of rust preventive pigment is contained, the aforementioned effect is obtained to a certain extent. On the other hand, if the content of the rust preventive pigment is too high, defects will occur in the formation of the resin coating 100. Therefore, the content of the rust preventive pigment is within a range of 0 to 30.0 mass %. A preferable lower limit of the content of the rust preventive pigment is 1.0 mass %, more preferably is 2.0 mass %, further preferably is 3.0 mass %, and more preferably is 4.0 mass %. A preferable upper limit of the content of the rust preventive pigment is 25.0 mass %, more preferably is 20.0 mass %, and further preferably is 10.0 mass %.

Coloring Pigment: 0 to 10.0 Mass %

In the present embodiment, the coloring pigment is not particularly limited as long as it is a well-known pigment which can color the resin coating 100. The coloring pigment is, for example, one or more types selected from a group consisting of copper phthalocyanine, zinc oxide, yellow iron oxide, iron oxide, and chromium hydroxide. The resin coating 100 may contain a plurality of types of coloring pigment. In a case where the resin coating 100 contains a plurality of types of coloring pigment, the term "content of the coloring pigment" refers to the total content of the plurality of types of coloring pigment.

In the present embodiment, a coloring pigment is a component that is optionally contained, and it need not be contained. That is, the content of the coloring pigment may be 0 mass %. When contained, the coloring pigment colors the resin coating 100. As a result, visual recognition of damage to the resin coating 100 is facilitated. If even a small amount of coloring pigment is contained, the aforementioned effect is obtained to a certain extent. On the other hand, if the content of the coloring pigment is too high, defects will occur in the formation of the resin coating 100. Therefore, the content of the coloring pigment is within a range of 0 to 10.0 mass %. A preferable lower limit of the content of the coloring pigment is 0.1 mass %, more preferably is 0.2 mass %, and further preferably is 0.5 mass %. In a case where a coloring pigment is contained, a preferable upper limit of the content of the coloring pigment is 8.0 mass %, more preferably is 5.0 mass %, and further preferably is 3.0 mass %.

Coupling Agent: 0 to 10.0 Mass %

In the present embodiment, the coupling agent is not particularly limited and, for example, is one type or two types selected from the group consisting of a silane coupling agent and a titanium coupling agent. The resin coating 100 may contain a plurality of types of coupling agent. In a case where the resin coating 100 contains a plurality of types of coupling agent, the term "content of the coupling agent" refers to the total content of the plurality of types of coupling agent.

In the present embodiment, a coupling agent is a component that is optionally contained, and it need not be contained. That is, the content of the coupling agent may be 0 mass %. When contained, the coupling agent increases the adhesiveness of the resin coating 100. Therefore, during repeated fastening and loosening of the oil-well metal pipe 1, the coupling agent suppresses delamination of the resin coating 100. If even a small amount of coupling agent is contained, the aforementioned effect is obtained to a certain extent. On the other hand, if the content of the coupling agent is more than 10.0 mass %, defects will occur in the formation of the resin coating 100. Therefore, the content of the coupling agent is within a range of 0 to 10.0 mass %. A preferable lower limit of the content of the coupling agent is 0.1 mass %, more preferably is 0.2 mass %, and further preferably is 0.5 mass %. A preferable upper limit of the content of the coupling agent is 8.0 mass %, more preferably is 6.0 mass %, and further preferably is 4.0 mass %.

Other Components: 0 to 10.0 Mass %

In the present embodiment, other components are components that are optionally contained, and these components need not be contained. That is, the content of other components may be 0 mass %. The term "other components" refers to, for example, one type or two types selected from the group consisting of an antiseptic agent and an antioxidant agent. When other components are contained, the content of the other components is 10.0 mass % or less in total. That is, the content of the other components is within a range of 0 to 10.0 mass % in total.

The resin coating 100 may be a resin coating 100 consisting of: a resin: 50.0 to 99.5 mass %, a wax: 0 to 10.0 mass %, a fluorine-based additive: 0 to 30.0 mass %, graphite: 0 to 10.0 mass %, a rust preventive pigment: 0 to 30.0 mass %, a coloring pigment: 0 to 10.0 mass %, a coupling agent: 0 to 10.0 mass %, other components: 0 to 10.0 mass %, and one type or two types selected from a group consisting of a magnesium silicate hydroxide powder: 1.5 to 50.0 mass % and $TiO_2$: 0.5 to 30.0 mass %

[Formula (1)]

On the premise that the resin coating 100 has the aforementioned components, the resin coating 100 satisfies the following Formula (1):

$$(W+F+G)/(M+T) \leq 5.00 \tag{1}$$

where, in Formula (1), the content in mass % of the wax is substituted for W, the content in mass % of the fluorine-based additive is substituted for F, the content in mass % of the graphite is substituted for G, the content in mass % of the magnesium silicate hydroxide powder is substituted for M, and the content in mass % of the $TiO_2$ is substituted for T.

Here, F1 (=(W+F+G)/(M+T)) is an indicator of the shear strength of the resin coating 100. As described above, the higher the content of the magnesium silicate hydroxide powder and the content of $TiO_2$ are, the higher the shear strength of the resin coating 100 becomes. On the other hand, the higher the contents of the wax, the fluorine-based additive and the graphite are, the lower the shear strength of the resin coating 100 becomes. Therefore, by making the ratio of the total content of the wax, the fluorine-based additive and the graphite to the total content of the magnesium silicate hydroxide powder and $TiO_2$ small, the shear strength of the resin coating 100 can be increased. Note that, with respect to the resin coating 100 having the aforementioned components, it has been verified by examples that are described later that the shear strength of the resin coating 100 can be made 36.00 MPa or more by making F1 a value of 5.00 or less.

Therefore, in the present embodiment, on the premise that the resin coating 100 has the aforementioned components, F1 is made 5.00 or less. A preferable upper limit of F1 is 4.90, more preferably is 4.80, and further preferably is 4.70. The lower limit of F1 is not particularly limited, and may be 0.00.

By the resin coating 100 containing the aforementioned components and satisfying Formula (1), the shear strength increases. As a result, the yield torque of the oil-well metal pipe 1 that includes the resin coating 100 rises.

[Shear Strength]

Although the shear strength of the resin coating 100 is not particularly limited, the higher the shear strength is, the more preferable it is. If the shear strength of the resin coating 100 is 36.00 MPa or more, the yield torque of the oil-well metal pipe 1 that includes the resin coating 100 can be markedly raised. Therefore, the shear strength of the resin coating 100 is preferably 36.00 MPa or more. A further preferable lower limit of the shear strength of the resin coating 100 is 36.50 MPa, more preferably is 36.70 MPa, and more preferably is 37.00 MPa. Whilst the upper limit of the shear strength of the resin coating 100 is not particularly limited, for example, the upper limit is 70.00 MPa.

[Method for Measuring Shear Strength]

The shear strength of the resin coating 100 can be measured by the following method. The shear strength of a test specimen on which the resin coating 100 is formed is determined using a surface and interfacial cutting analysis system (manufactured by DAIPLA WINTES CO., LTD; product name: SAICAS). Specifically, the resin coating 100 is formed on a cold-rolled steel plate (chemical composition: C≤0.15%, Mn≤0.60%, P≤0.100%, S≤0.050%, and the balance: Fe and impurities). The target coating thickness is set to 20 μm. Using a sharp cutting blade, the surface of the resin coating 100 is cut diagonally at an angle of 10° under a constant speed (horizontal speed of 2 μm/sec, vertical speed of 0.2 μm/sec) to cause the resin coating 100 to peel off from the cold-rolled steel plate. Note that, the test is conducted entirely at room temperature. At such time, the shear strength (MPa) of the resin coating 100 can be determined based on the horizontal force and vertical force applied to the cutting blade and also the vertical displacement.

[Thickness of Resin Coating]

In the present embodiment, the thickness of the resin coating 100 is not particularly limited. The thickness of the resin coating 100 is, for example, 1 to 100 μm. In this case, the yield torque of the oil-well metal pipe 1 can be more stably increased. The lower limit of the thickness of the resin coating 100 is preferably 2 μm, further preferably is 5 μm, and further preferably is 10 μm. The upper limit of the thickness of the resin coating 100 is preferably 50 μm, further preferably is 40 μm, and further preferably is 30 μm.

[Method for Measuring Thickness of Resin Coating]

The thickness of the resin coating 100 can be measured by the following method. A probe of an electromagnetic induction type film thickness measuring instrument is brought into contact with the pin contact surface 400 or the box contact surface 500 on which the resin coating 100 is formed. The probe has an electromagnet, and when a magnetic body is brought close to it, electromagnetic induction occurs, and its voltage changes depending on the distance between the probe and the magnetic body. The thickness of the resin coating 100 is determined from the change in voltage amount. The measurement locations are twelve locations (twelve locations that are at 0°, 30°, 60°, 90°, 120°, 150°, 180°, 210°, 240°, 270°, 300° and) 330° in the tube circumferential direction of the oil-well metal pipe 1. The arithmetic mean value of the measurement results for the twelve locations is taken to be the thickness of the resin coating 100.

[Chemical Composition of Pipe Main Body]

The chemical composition of the pipe main body 10 of the oil-well metal pipe 1 according to the present embodiment is not particularly limited. Accordingly, the kind of steel of the pipe main body 10 of the oil-well metal pipe 1 is not particularly limited. The pipe main body 10 may be formed of, for example, carbon steel, stainless steel, alloy steel or the like. Accordingly, the oil-well metal pipe 1 may be a steel pipe made of Fe-based alloy or an alloy pipe represented by a Ni-based alloy pipe. Here, the steel pipe is, for example, a low-alloy steel pipe, a martensitic stainless steel pipe, and a duplex stainless steel pipe. Among alloy steels, high alloy steels such as a Ni-based alloy and duplex stainless steels that contain alloying elements such as Cr, Ni and Mo have high corrosion resistance. Therefore by using these high alloy steels as the pipe main body 10, excellent corrosion resistance is obtained in a corrosive environment that contains hydrogen sulfide or carbon dioxide or the like.

[Production Method]

A method for producing the oil-well metal pipe 1 according to the present embodiment will be described hereunder.

The method for producing the oil-well metal pipe 1 according to the present embodiment includes a preparation process, an application process, and a hardening process. The hardening process is performed after the application process.

[Preparation Process]

In the preparation process, the oil-well metal pipe 1 having the pipe main body 10 that includes the pin 40 including the pin contact surface 400 that includes the external thread part 41, and the box 50 including the box contact surface 500 that includes the internal thread part 51 is prepared. As described above, the oil-well metal pipe 1 according to the present embodiment has a well-known structure. In other words, in the preparation process it suffices to prepare the oil-well metal pipe 1 that has a well-known structure.

[Application Process]

In the application process, a composition is applied onto at least one of the pin contact surface 400 and the box contact surface 500 of the prepared oil-well metal pipe 1. The composition is a composition for forming the aforementioned resin coating 100. The composition contains: a resin: 50.0 to 99.5 mass %, a wax: 0 to 10.0 mass %, a fluorine-based additive: 0 to 30.0 mass %, graphite: 0 to 10.0 mass %, a rust preventive pigment: 0 to 30.0 mass %, a coloring pigment: 0 to 10.0 mass %, a coupling agent: 0 to 10.0 mass %, and one type or two types selected from the group consisting of magnesium silicate hydroxide powder: 1.5 to 50.0 mass % and $TiO_2$: 0.5 to 30.0 mass %; and satisfies Formula (1). The composition further contains a solvent. The composition for forming the resin coating 100 is the same as the composition of the resin coating 100 described above, excluding a solvent.

The composition can be produced, for example, by melting or dispersing the resin, the magnesium silicate hydroxide powder and/or the $TiO_2$, and, as necessary, other components in the solvent and mixing them. The solvent is, for example, one or more types selected from the group consisting of water, alcohol and an organic solvent. The solvent may contain a small amount of a surfactant. The proportion of the solvent is not particularly limited. It suffices to adjust the proportion of the solvent to an appropriate viscosity according to the application method. The proportion of the solvent is, for example, within a range of 40 to 60 mass % when taking the total of all components other than the solvent as 100 mass %.

The method of applying the composition on the pin contact surface 400 and/or the box contact surface 500 is not particularly limited, and a well-known method may be used. For example, the composition in solution form is applied on the pin contact surface 400 and/or the box contact surface 500 by spray coating. In this case, the viscosity of the composition is to be adjusted so that it can be applied by spray coating in an environment at normal temperature and normal pressure. Another application method, such as brushing or dipping may be employed as the method for applying the composition on the pin contact surface 400 and/or the box contact surface 500, instead of spray application.

[Hardening Process]

In the hardening process, the applied composition is hardened to form the resin coating 100. By heating the composition that was applied onto at least one of the pin contact surface 400 and the box contact surface 500, the composition is subjected to thermal curing and the solid resin coating 100 is formed. The heating method is not particularly limited, and a well-known method may be used. The heating method is, for example, a method in which the oil-well metal pipe 1 on which the composition has been applied is inserted into a well-known heating furnace and heated. The heating temperature is, for example, 200 to 250° C., and the heating time is, for example, 5 to 30 minutes.

The oil-well metal pipe 1 according to the present embodiment is produced by the above processes. Note that, the method for producing the oil-well metal pipe 1 according to the present embodiment may include other processes.

[Preconditioning Treatment Process]

The method for producing the oil-well metal pipe 1 according to the present embodiment may further include a preconditioning treatment process prior to the application process. In the preconditioning treatment process, for example, one or more types of treatment selected from the group consisting of a pickling treatment, a blasting treatment and an alkaline degreasing treatment is performed.

In the case of performing a pickling treatment, for example, the pin contact surface 400 and/or the box contact surface 500 is immersed in a strongly acidic solution such as sulfuric acid, hydrochloric acid, nitric acid, hydrofluoric acid or a mixture of these acids, to thereby increase the surface roughness of the pin contact surface 400 and/or the box contact surface 500. In the case of performing a blasting treatment, for example, sand blasting is performed in which a blast material (an abrasive) is mixed with compressed air, and the mixture is propelled onto the pin contact surface 400 and/or the box contact surface 500. In this case, the surface roughness of the pin contact surface 400 and/or the box contact surface 500 increases.

Note that, in the preconditioning treatment process, the pin contact surface 400 and the box contact surface 500 may be subjected to the same processes or may be subjected to different processes to each other. Further, the preconditioning treatment process may be performed only on the pin contact surface 400, or may be performed only on the box contact surface 500.

The oil-well metal pipe 1 according to the present embodiment is produced by the above processes. However, the production method described above is one example of a method for producing the oil-well metal pipe 1 according to the present embodiment, and the present embodiment is not limited to the production method described above. The oil-well metal pipe 1 according to the present embodiment may also be produced by another method.

Example

The advantageous effects of the oil-well metal pipe of the present embodiment are described more specifically hereunder by way of examples. The conditions adopted in the following examples are one example of conditions which are employed for confirming the workability and advantageous effects of the oil-well metal pipe of the present embodiment. Accordingly, the oil-well metal pipe of the present embodiment is not limited to this one example of the conditions.

In the examples, compositions for forming resin coatings were prepared, and the shear strength of the respective resin coatings was evaluated. The specific details are described in the following.

[Shear Strength Evaluation Test]

Compositions having the chemical compositions shown in Table 1 were prepared. The respective components in mass % of the composition of each test number, and F1 that was determined based on the respective components and Formula (1) are shown in Table 1. Note that, each composition contained a solvent in addition to the chemical composition described in Table 1. A mixed solution of water, alcohol and a surfactant was used as the solvent. Each prepared composition was applied to a cold-rolled steel plate (chemical composition: C≤0.15%, Mn≤ 0.60%, P≤0.100%, S≤0.050%, and the balance: Fe and impurities). The target coating thickness was set to 20 μm. The cold-rolled steel plate to which the composition had been applied was heated in a heating furnace at a temperature of 200 to 250° C. for 5 to 30 minutes, and a resin coating was formed.

TABLE 1

| | Resin Coating Composition | | | | | | | | | | | | |
|---|---|---|---|---|---|---|---|---|---|---|---|---|
| Test Number | Epoxy Resin (mass %) | Urethane Resin (mass %) | Resin (mass %) | Wax (mass %) | Fluorine-Based Additive (mass %) | Graphite (mass %) | Rust Preventive Pigment (mass %) | Coloring Pigment (mass %) | Silane Coupling Agent (mass %) | Titanium Coupling Agent (mass %) | Magnesium Silicate Hydroxide Powder (mass %) | $TiO_2$ (mass %) | F1 | Evaluation Result Shear Strength (MPa) |
| 1 | 98.6 | 0.0 | 98.6 | 0.0 | 0.0 | 0.0 | 0.0 | 0.0 | 0.0 | 0.0 | 0.0 | 1.4 | 0.00 | 58.30 |
| 2 | 89.9 | 0.0 | 89.9 | 0.0 | 0.0 | 0.0 | 7.6 | 1.1 | 0.0 | 0.0 | 0.0 | 1.4 | 0.00 | 55.67 |
| 3 | 77.6 | 0.0 | 77.6 | 0.0 | 12.0 | 0.0 | 7.0 | 1.0 | 0.0 | 0.0 | 2.4 | 0.0 | 5.00 | 37.9 |
| 4 | 85.6 | 0.0 | 85.6 | 0.0 | 0.0 | 0.0 | 7.0 | 1.0 | 3.0 | 0.0 | 3.4 | 0.0 | 0.00 | 42.09 |
| 5 | 77.1 | 0.0 | 77.1 | 0.0 | 0.0 | 0.0 | 4.9 | 1.0 | 2.4 | 0.0 | 14.6 | 0.0 | 0.00 | 40.30 |
| 6 | 77.1 | 0.0 | 77.1 | 0.0 | 0.0 | 0.0 | 0.0 | 1.0 | 2.4 | 0.0 | 19.5 | 0.0 | 0.00 | 56.00 |
| 7 | 84.4 | 0.0 | 84.4 | 4.9 | 0.0 | 0.0 | 7.3 | 1.0 | 0.0 | 0.0 | 2.4 | 0.0 | 2.04 | 39.02 |
| 8 | 67.5 | 0.0 | 67.5 | 9.8 | 0.0 | 0.0 | 4.9 | 1.0 | 2.1 | 0.0 | 14.7 | 0.0 | 0.67 | 36.30 |
| 9 | 72.3 | 0.0 | 72.3 | 4.9 | 0.0 | 0.0 | 4.9 | 1.0 | 2.2 | 0.0 | 14.7 | 0.0 | 0.33 | 40.30 |
| 10 | 73.1 | 0.0 | 73.1 | 3.0 | 0.0 | 0.0 | 4.9 | 1.0 | 3.0 | 0.0 | 15.0 | 0.0 | 0.20 | 42.27 |
| 11 | 73.1 | 0.0 | 73.1 | 0.0 | 0.0 | 3.0 | 4.9 | 1.0 | 3.0 | 0.0 | 15.0 | 0.0 | 0.20 | 40.48 |
| 12 | 65.1 | 0.0 | 65.1 | 3.0 | 3.0 | 0.0 | 4.9 | 1.0 | 3.0 | 0.0 | 20.0 | 0.0 | 0.30 | 44.22 |
| 13 | 65.7 | 0.0 | 65.7 | 0.0 | 2.0 | 2.0 | 4.9 | 1.0 | 3.0 | 0.0 | 20.0 | 1.4 | 0.19 | 44.41 |
| 14 | 64.7 | 0.0 | 64.7 | 3.0 | 0.0 | 2.0 | 4.9 | 1.0 | 3.0 | 0.0 | 20.0 | 1.4 | 0.23 | 40.64 |
| 15 | 63.7 | 0.0 | 63.7 | 2.0 | 2.0 | 2.0 | 4.9 | 1.0 | 3.0 | 0.0 | 20.0 | 1.4 | 0.28 | 39.85 |
| 16 | 79.0 | 0.0 | 79.0 | 0.0 | 4.5 | 0.0 | 7.6 | 1.0 | 3.0 | 0.0 | 0.0 | 5.1 | 0.88 | 40.33 |
| 17 | 69.0 | 0.0 | 69.0 | 0.0 | 4.5 | 0.0 | 7.6 | 1.0 | 3.0 | 0.0 | 0.0 | 15.0 | 0.30 | 55.67 |
| 18 | 80.3 | 0.0 | 80.3 | 0.0 | 3.0 | 0.0 | 7.3 | 1.0 | 0.0 | 3.4 | 5.0 | 0.0 | 0.60 | 58.00 |
| 19 | 59.7 | 0.0 | 59.7 | 0.0 | 0.0 | 0.0 | 4.9 | 1.0 | 3.0 | 0.0 | 30.0 | 1.4 | 0.00 | 36.89 |
| 20 | 71.1 | 0.0 | 71.1 | 5.0 | 10.0 | 0.0 | 4.9 | 1.0 | 0.0 | 3.0 | 5.0 | 0.0 | 3.00 | 43.16 |
| 21 | 0.0 | 80.3 | 80.3 | 0.0 | 3.0 | 0.0 | 7.3 | 1.0 | 0.0 | 3.4 | 5.0 | 0.0 | 0.60 | 47.31 |
| 22 | 0.0 | 76.0 | 76.0 | 0.0 | 10.7 | 0.0 | 7.0 | 1.0 | 0.0 | 0.0 | 0.0 | 5.0 | 2.14 | 47.07 |
| 23 | 57.0 | 0.0 | 57.0 | 0.0 | 12.0 | 0.0 | 22.0 | 9.0 | 0.0 | 0.0 | 0.0 | 0.0 | — | 35.87 |
| 24 | 61.1 | 0.0 | 61.1 | 5.0 | 15.0 | 10.0 | 4.9 | 1.0 | 0.0 | 3.0 | 0.0 | 0.0 | — | 33.66 |
| 25 | 56.1 | 0.0 | 56.1 | 10.0 | 20.0 | 0.0 | 4.9 | 1.0 | 0.0 | 3.0 | 5.0 | 0.0 | 6.00 | 34.91 |
| 26 | 56.1 | 0.0 | 56.1 | 10.0 | 10.0 | 10.0 | 4.9 | 1.0 | 0.0 | 3.0 | 5.0 | 0.0 | 6.00 | 34.91 |
| 27 | 0.0 | 57.0 | 57.0 | 0.0 | 30.0 | 0.0 | 7.0 | 1.0 | 0.0 | 0.0 | 0.0 | 5.0 | 6.00 | 16.73 |
| 28 | 0.0 | 57.0 | 57.0 | 0.0 | 29.6 | 0.0 | 7.0 | 1.0 | 0.0 | 0.0 | 0.0 | 5.0 | 5.91 | 15.04 |
| 29 | 48.6 | 0.0 | 48.6 | 0.0 | 0.0 | 0.0 | 7.5 | 1.0 | 2.5 | 0.0 | 39.0 | 1.4 | 0.00 | 16.30 |
| 30 | 49.8 | 0.0 | 49.8 | 0.0 | 0.0 | 0.0 | 7.7 | 1.1 | 0.0 | 0.0 | 40.0 | 1.4 | 0.00 | 33.41 |

The shear strength of the cold-rolled steel plate of each test number on which a resin coating was formed was measured. The shear strength was measured by the method described above. The obtained shear strength (MPa) of each test number is shown in Table 1.

Evaluation Results

Referring to Table 1, with respect to the resin coatings of Test Numbers 1 to 22, the content of each component was appropriate and the composition of each of the resin coatings satisfied Formula (1). As a result, the shear strength of each of these resin coatings was 36.00 MPa or more, and thus these resin coatings had a high shear strength.

On the other hand, the resin coatings of Test Numbers 23 and 24 did not contain either magnesium silicate hydroxide powder or $TiO_2$. As a result, the shear strength of these resin coatings was less than 36.00 MPa, and thus these resin coatings did not have a high shear strength.

In Test Numbers 25 to 28, although the content of each component in the respective resin coatings was appropriate, the compositions of these resin coatings did not satisfy Formula (1). As a result, the shear strength of these resin coatings was less than 36.00 MPa, and thus these resin coatings did not have a high shear strength.

In the resin coatings of Test Numbers 29 and 30, the resin content was too low. As a result, the shear strength of these resin coatings was less than 36.00 MPa, and thus these resin coatings did not have a high shear strength.

An embodiment of the present disclosure has been described above. However, the foregoing embodiment is merely an example for implementing the present disclosure. Accordingly, the present disclosure is not limited to the above embodiment, and the above embodiment can be appropriately modified within a range which does not deviate from the gist of the present disclosure.

REFERENCE SIGNS LIST

1 Oil-well metal pipe
10 Pipe Main Body
10A First End Portion
10B Second End Portion
11 Pin Tube Body
12 Coupling
40 Pin
41 External Thread Part
42 Pin Sealing Surface
43 Pin Shoulder Surface
50 Box
51 Internal Thread Part
52 Box Sealing Surface
53 Box Shoulder Surface
100 Resin Coating
400 Pin Contact Surface
500 Box Contact Surface

The invention claimed is:

1. An oil-well metal pipe, comprising:
a pipe main body including a first end portion and a second end portion;
wherein:
the pipe main body includes:
a pin formed at the first end portion, and
a box formed at the second end portion;
the pin includes:
a pin contact surface including an external thread part;
the box includes:
a box contact surface including an internal thread part;
the oil-well metal pipe further comprising:
a resin coating on or above at least one of the pin contact surface and the box contact surface;
the resin coating containing:
a resin: 50.0 to 99.5 mass %,
a wax: 0 to 10.0 mass %,
a fluorine-based additive: 0 to 30.0 mass %,
graphite: 0 to 10.0 mass %,
a rust preventive pigment: 0 to 30.0 mass %,
a coloring pigment: 0 to 10.0 mass %,
a coupling agent: 0 to 10.0 mass %, and
one type or two types selected from a group consisting of a magnesium silicate hydroxide powder: 1.5 to 50.0 mass % and $TiO_2$: 0.5 to 30.0 mass %;
and satisfying Formula (1):

$$(W+F+G)/(M+T) \leq 5.00 \qquad (1)$$

where, in Formula (1), a content in mass % of the wax is substituted for W, a content in mass % of the fluorine-based additive is substituted for F, a content in mass % of the graphite is substituted for G, a content in mass % of the magnesium silicate hydroxide powder is substituted for M, and a content in mass % of the $TiO_2$ is substituted for T.

2. The oil-well metal pipe according to claim 1, wherein:
the resin is one type or two types selected from a group consisting of epoxy resin and urethan resin.

3. The oil-well metal pipe according to claim 1 or claim 2, wherein:
the pin contact surface further includes a pin sealing surface and a pin shoulder surface, and
the box contact surface further includes a box sealing surface and a box shoulder surface.

* * * * *